US010474103B2

(12) United States Patent
Holstine

(10) Patent No.: US 10,474,103 B2
(45) Date of Patent: Nov. 12, 2019

(54) HOLOGRAPHIC IMAGE APPARATUS FOR HIGH DEPTH OF FIELD HOLOGRAMS

(71) Applicant: Universal City Studios LLC, Universal City, CA (US)

(72) Inventor: Danielle Holstine, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 51 days.

(21) Appl. No.: 15/705,107

(22) Filed: Sep. 14, 2017

(65) Prior Publication Data
US 2018/0181066 A1    Jun. 28, 2018

Related U.S. Application Data

(60) Provisional application No. 62/439,390, filed on Dec. 27, 2016.

(51) Int. Cl.
| G03H 1/26 | (2006.01) |
|---|---|
| G03H 1/30 | (2006.01) |
| G03H 1/22 | (2006.01) |
| G02B 27/22 | (2018.01) |

(52) U.S. Cl.
CPC .............. *G03H 1/268* (2013.01); *G03H 1/30* (2013.01); *G02B 27/2278* (2013.01); *G03H 1/2286* (2013.01); *G03H 1/265* (2013.01); *G03H 2001/2223* (2013.01); *G03H 2001/2252* (2013.01); *G03H 2001/2257* (2013.01); *G03H 2001/2281* (2013.01); *G03H 2001/261* (2013.01); *G03H 2001/262* (2013.01); *G03H 2210/33* (2013.01); *G03H 2222/34* (2013.01); *G03H 2222/46* (2013.01); *G03H 2227/03* (2013.01)

(58) Field of Classification Search
CPC .......... G02B 27/2278; G03H 2210/33; G03H 2227/03; G03H 1/268; G03H 1/30; G03H 1/2286; G03H 1/265; G03H 2001/2223; G03H 2001/2252; G03H 2001/2257; G03H 2001/2281; G03H 2001/261; G03H 2001/262; G03H 2222/34; G03H 2222/46
USPC .......................................................... 359/23
See application file for complete search history.

(56) References Cited

U.S. PATENT DOCUMENTS

| 4,420,218 A | * | 12/1983 | Rubanov | G03H 1/22 |
|---|---|---|---|---|
| | | | | 359/24 |
| 4,783,133 A | | 11/1988 | Chen | |
| 5,066,525 A | * | 11/1991 | Nakamachi | B32B 17/10036 |
| | | | | 156/99 |
| 5,341,229 A | * | 8/1994 | Rowan | G03H 1/28 |
| | | | | 359/10 |
| 5,654,116 A | * | 8/1997 | Kato | G03H 1/0256 |
| | | | | 359/1 |
| 5,691,830 A | * | 11/1997 | Dickson | G02B 5/3025 |
| | | | | 359/1 |

(Continued)

*Primary Examiner* — William R Alexander
(74) *Attorney, Agent, or Firm* — Fletcher Yoder, P.C.

(57) ABSTRACT

A hologram image apparatus includes a plurality of holographic panels, each holographic panel comprising a transparent panel encoded with a portion of a composite hologram image. The hologram image apparatus also includes one or more light sources configured to illuminate each holographic panel of the plurality of the holographic panels from one or more incident angles to produce the composite hologram image.

15 Claims, 7 Drawing Sheets

(56) References Cited

U.S. PATENT DOCUMENTS

| | | | | |
|---|---|---|---|---|
| 5,726,782 A * | 3/1998 | Kato | G02B 5/32 | 359/13 |
| 5,734,485 A * | 3/1998 | Buchkremer | G03H 1/24 | 359/1 |
| 5,898,511 A * | 4/1999 | Mizutani | G02B 27/0103 | 359/1 |
| 5,956,180 A * | 9/1999 | Bass | G02B 27/2278 | 359/479 |
| 6,476,944 B1 * | 11/2002 | La Russa | G02B 5/32 | 359/1 |
| 6,721,023 B1 * | 4/2004 | Weiss | G02B 27/2278 | 348/E13.005 |
| 2001/0013960 A1 * | 8/2001 | Popovich | G02B 5/32 | 359/15 |
| 2003/0020975 A1 * | 1/2003 | Metz | G02B 5/32 | 359/15 |
| 2004/0207995 A1 * | 10/2004 | Park | G02B 6/0036 | 362/611 |
| 2006/0273983 A1 * | 12/2006 | Koo | G02B 27/2278 | 345/6 |
| 2007/0165027 A1 * | 7/2007 | Nakadaira | G02B 27/2278 | 345/426 |
| 2010/0046050 A1 * | 2/2010 | Kroll | G03H 1/02 | 359/9 |
| 2012/0194885 A1 | 8/2012 | Han et al. | | |
| 2012/0270649 A1 * | 10/2012 | Griswold | G02B 27/2278 | 463/31 |
| 2013/0063817 A1 * | 3/2013 | Santori | G02B 27/0172 | 359/471 |
| 2013/0208329 A1 | 8/2013 | Harvill | | |
| 2013/0269865 A1 * | 10/2013 | Drinkwater | B42D 15/025 | 156/234 |
| 2014/0192281 A1 * | 7/2014 | Smithwick | G02F 1/1313 | 349/15 |
| 2016/0231707 A1 | 8/2016 | Chiu et al. | | |
| 2016/0330435 A1 * | 11/2016 | Yamaichi | G02B 27/2278 | |
| 2017/0212289 A1 * | 7/2017 | Wiltshire | G02B 5/32 | |
| 2018/0063519 A1 * | 3/2018 | Smithwick | G02B 27/225 | |

* cited by examiner

HOLOGRAPHIC IMAGE APPARATUS FOR HIGH DEPTH OF FIELD HOLOGRAMS

CROSS REFERENCE TO RELATED APPLICATION

This application claims priority to and benefit of U.S. Provisional Patent Application No. 62/439,390, entitled "HIGH DEPTH OF FIELD HOLOGRAMS," filed Dec. 27, 2016, which is herein incorporated by reference in its entirety.

BACKGROUND

The present disclosure relates generally to image display, and more particularly to apparatus and method for displaying holographic imagery.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A hologram is produced by illuminating a holographic medium (e.g., a holographic panel or print) that encodes a light field emanating from a scene as an interference pattern. When the holographic medium is suitably illuminated with a light source, the interference pattern diffracts the light into a three-dimensional (3D) hologram image that exhibits visual depth cue such as parallax and perspective. In addition, a hologram may include multiple 3D hologram images (e.g., a multi-channel hologram), wherein each image corresponds to a respective position of an observer or corresponds to an incident angle of a light source. Recently there is growing interest to use holographic media to create 3D recordings of scenes that can be seen without the aid of special glasses or other intermediate optics. However, current hologram technology may have a limited depth of field (DOF) due to various factors, such as the coherence length of a laser and the quality of the holographic panel, leading to limited holographic element resolution of the holographic panel.

BRIEF DESCRIPTION

Certain embodiments commensurate in scope with the originally claimed subject matter are discussed below. These embodiments are not intended to limit the scope of the disclosure. Indeed, the present disclosure may encompass a variety of forms that may be similar to or different from the embodiments set forth below.

In accordance with one aspect of the present disclosure a hologram image apparatus includes a plurality of holographic panels, each holographic panel comprising a transparent panel encoded with a portion of a composite hologram image. The hologram image apparatus also includes one or more light sources configured to illuminate each holographic panel of the plurality of the holographic panels from one or more incident angles to produce the composite hologram image.

In accordance with another aspect of the present disclosure a method of forming a composite hologram includes placing holographic panels adjacent to one another such that a gap exists between adjacent holographic panels, wherein the gap is such that respective depths of field of adjacent holographic panels overlap with one another. The method also includes illuminating the holographic panels from one or more incident angles using one or more light sources to produce the composite hologram.

In accordance with another aspect of the present disclosure a holographic panel includes a transparent panel encoded with only a portion of a composite hologram image, wherein the transparent panel is transparent with respect to visible light.

DRAWINGS

These and other features, aspects, and advantages of the present disclosure will become better understood when the following detailed description is read with reference to the accompanying drawings in which like characters represent like parts throughout the drawings, wherein.

Figure 2:
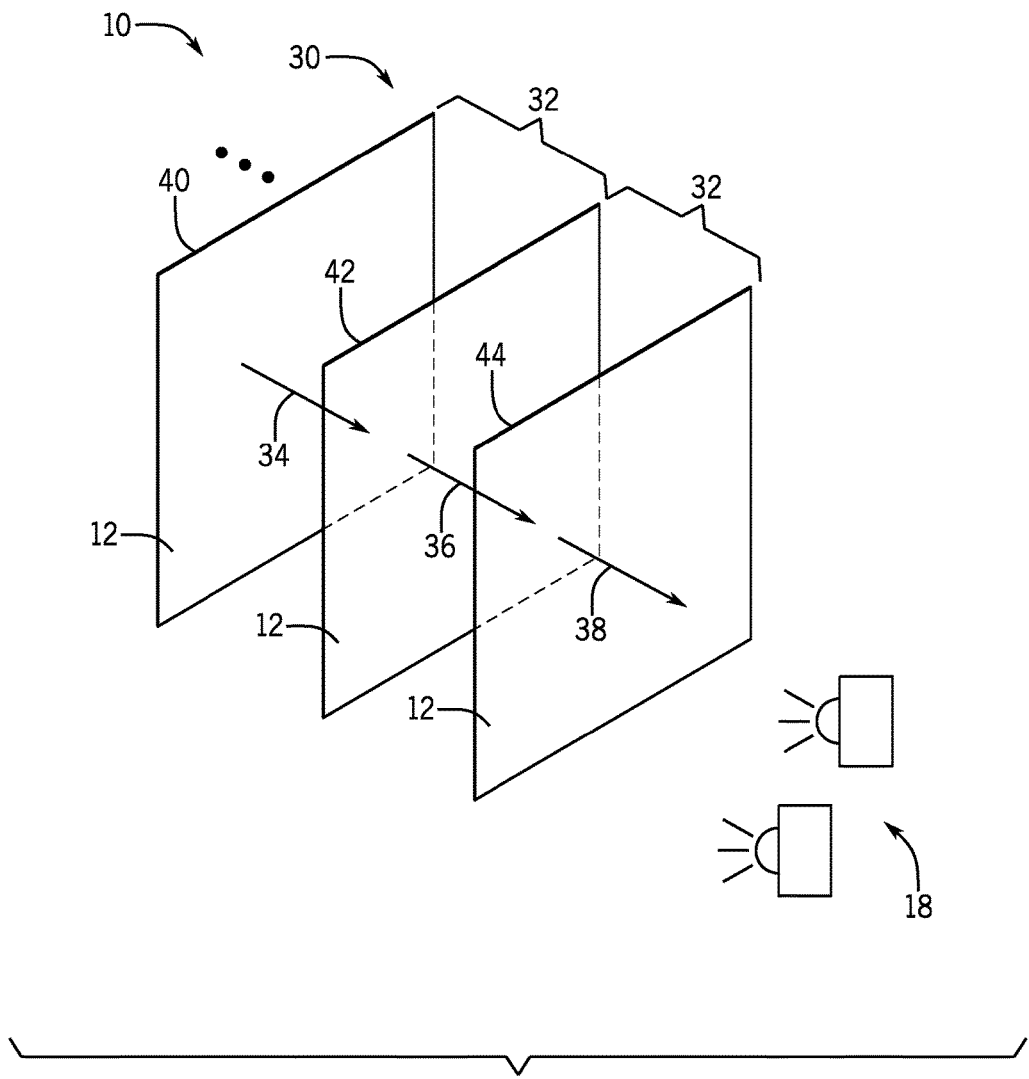
FIG. 2 is a perspective view of a schematic of a holographic image apparatus that includes a plurality of holographic panels to form a composite hologram image, in accordance with an embodiment.
Figure 3A:
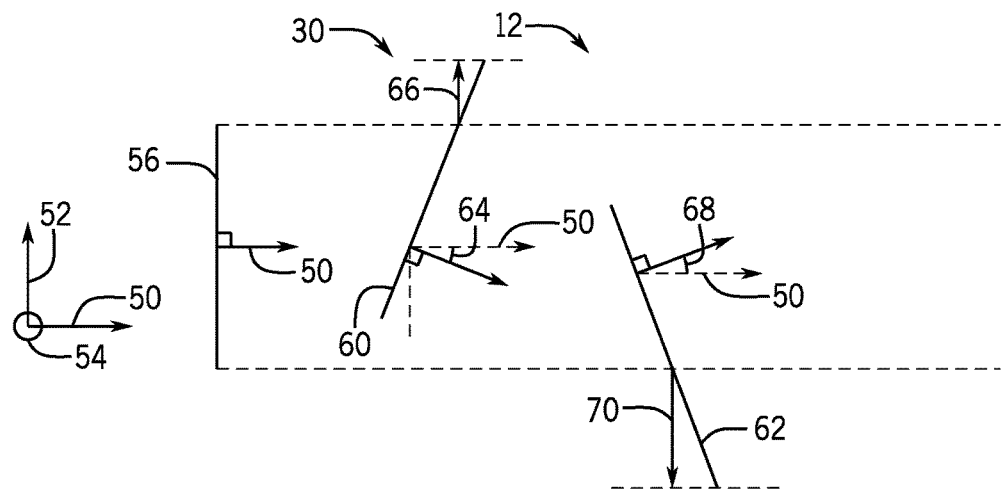
Figure 3B:
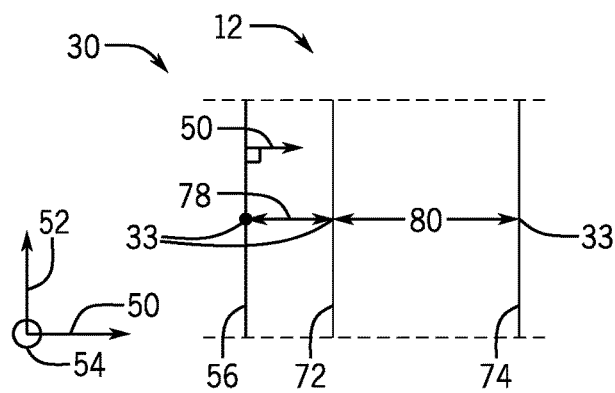
Figure 3C:
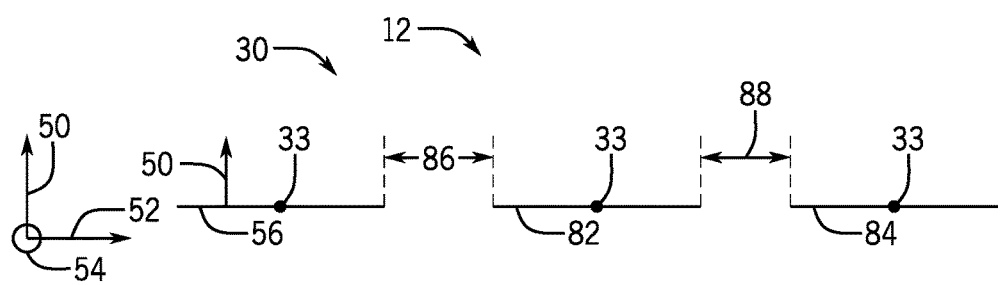
Figure 4:
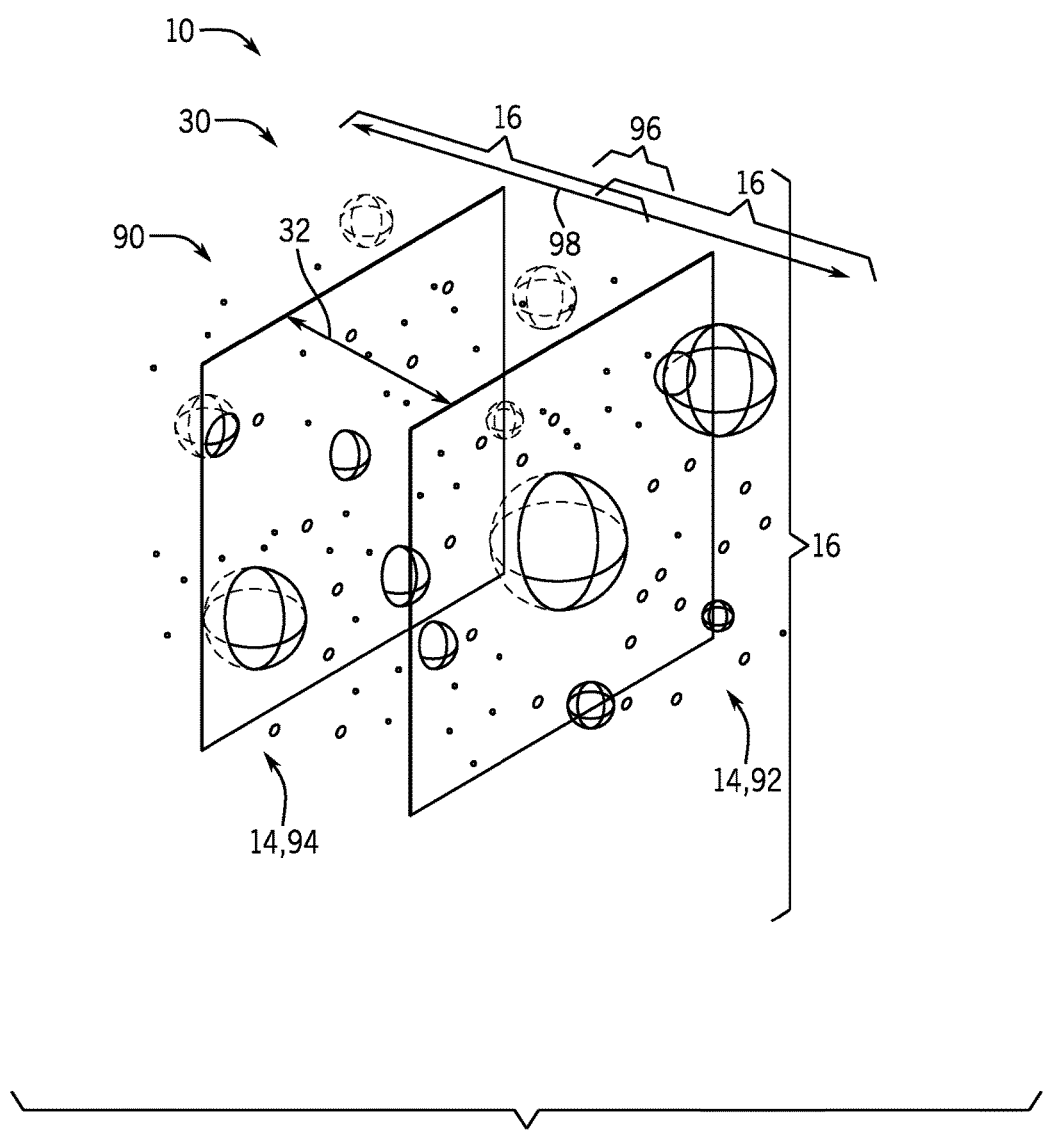
Figure 5:
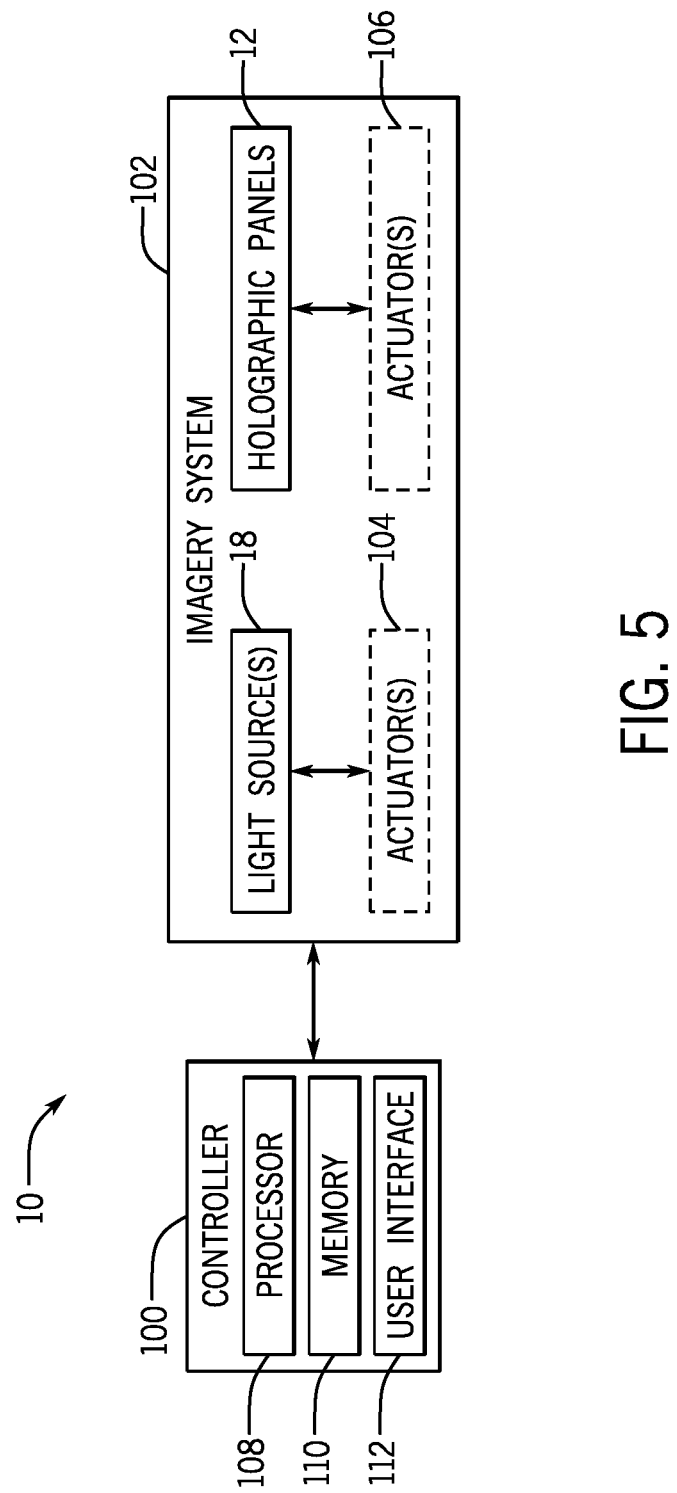
Figure 6:
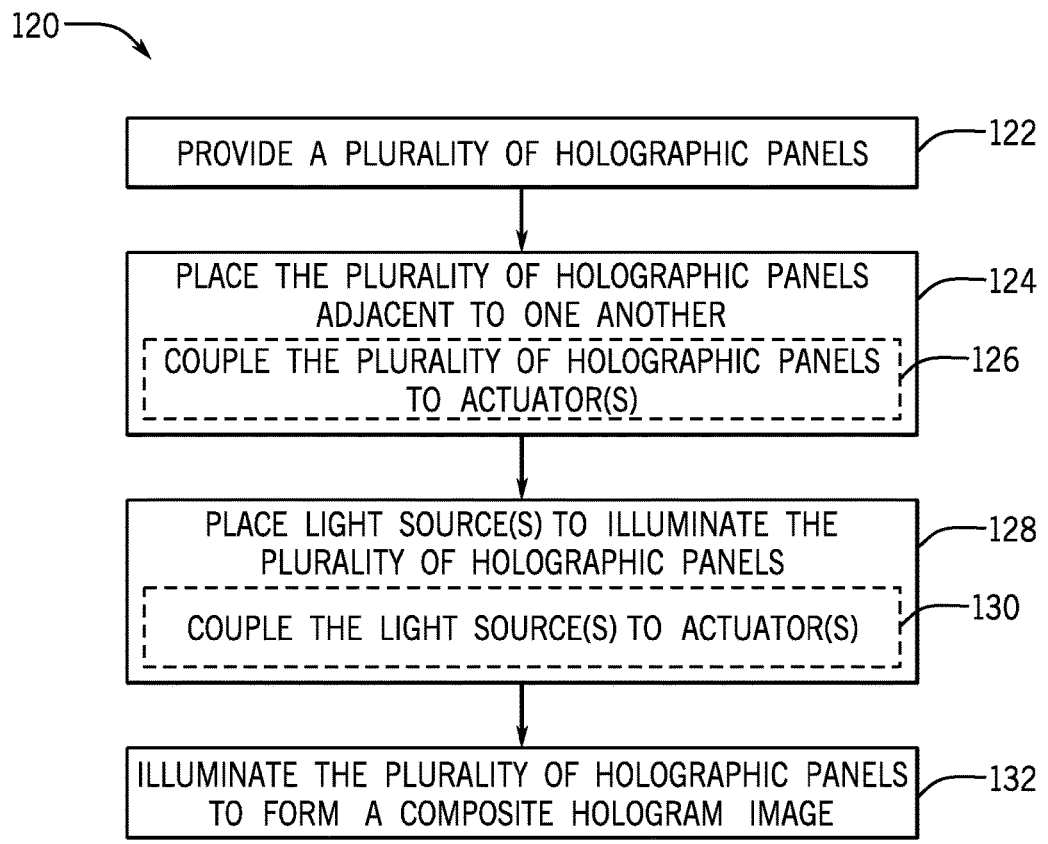
Figure 7:
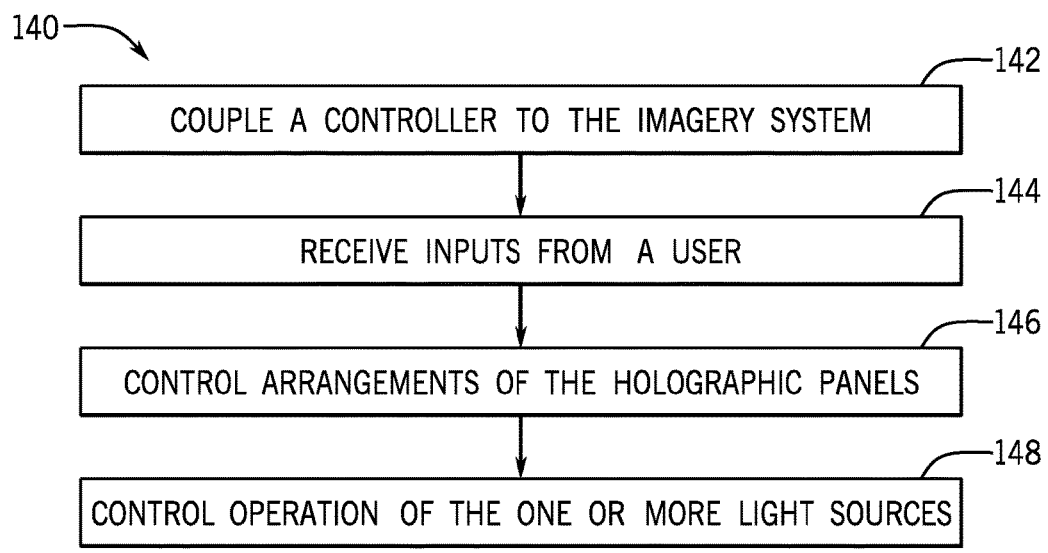

FIGS. 3A, 3B, and 3C are examples of arrangements of a plurality of holographic panels, in accordance with embodiments of the present disclosure;

FIG. 4 is a perspective view of a schematic of a composite hologram image produced by the holographic image apparatus of FIG. 2, in accordance with an embodiment;

FIG. 5 is a block diagram of the holographic image apparatus of FIG. 2, in accordance with an embodiment;

FIG. 6 is a flow chart illustrating an example of a method of forming a composite hologram using the holographic image apparatus of FIG. 2, in accordance with an embodiment; and FIG. 7 is a flow chart illustrating an example of a method of operating the holographic image apparatus of FIG. 2, in accordance with an embodiment.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As set forth above, while there is growing interest in using holographic media (e.g., holographic panels or prints) to create 3D recordings of scenes, current hologram technology may have a limited depth of field (DOF), leading to limited holographic element resolution of the holographic media. As such, any 3D imagery created on the holographic panel appears the clearest, the most in-focus, as the 3D imagery approaches the plane of the surface of the holographic panel, and the imagery that is farther away from the surface plane becomes blurry and out of focus. One approach to ensure the entire 3D imagery is crisp and in-focus may be to bind the content within a limited depth field. However, it is now recognized that this approach does not achieve the effect of depth needed to create deep, immersive scenes.

With this in mind, present embodiments are directed to an apparatus and method for producing high DOF and in-focus 3D holographic images. As discussed in greater detail below, in accordance with present embodiments, a composite hologram image is formed using a plurality of substantially transparent holographic panels each encoded with a portion of the composite hologram image. The plurality of holographic panels are placed adjacent to one another, such that a gap exists between adjacent holographic panels and respective DOFs of adjacent holographic panels overlap with one another. The hologram images of the plurality of holographic panels together form the composite hologram image. By keeping the hologram of each holographic panel within its respective DOF and by stacking the holographic panels adjacent to one another, the DOF of the composite hologram image is tunable without altering the holographic element resolution. For example, the DOF of the composite hologram image may increase with the number of holographic panels. As such, the overall depth effect may far exceed that possible from a single holographic panel, and a composite hologram image showing an in-focus, deep, and immersive scene may be achieved.

Figure 1:
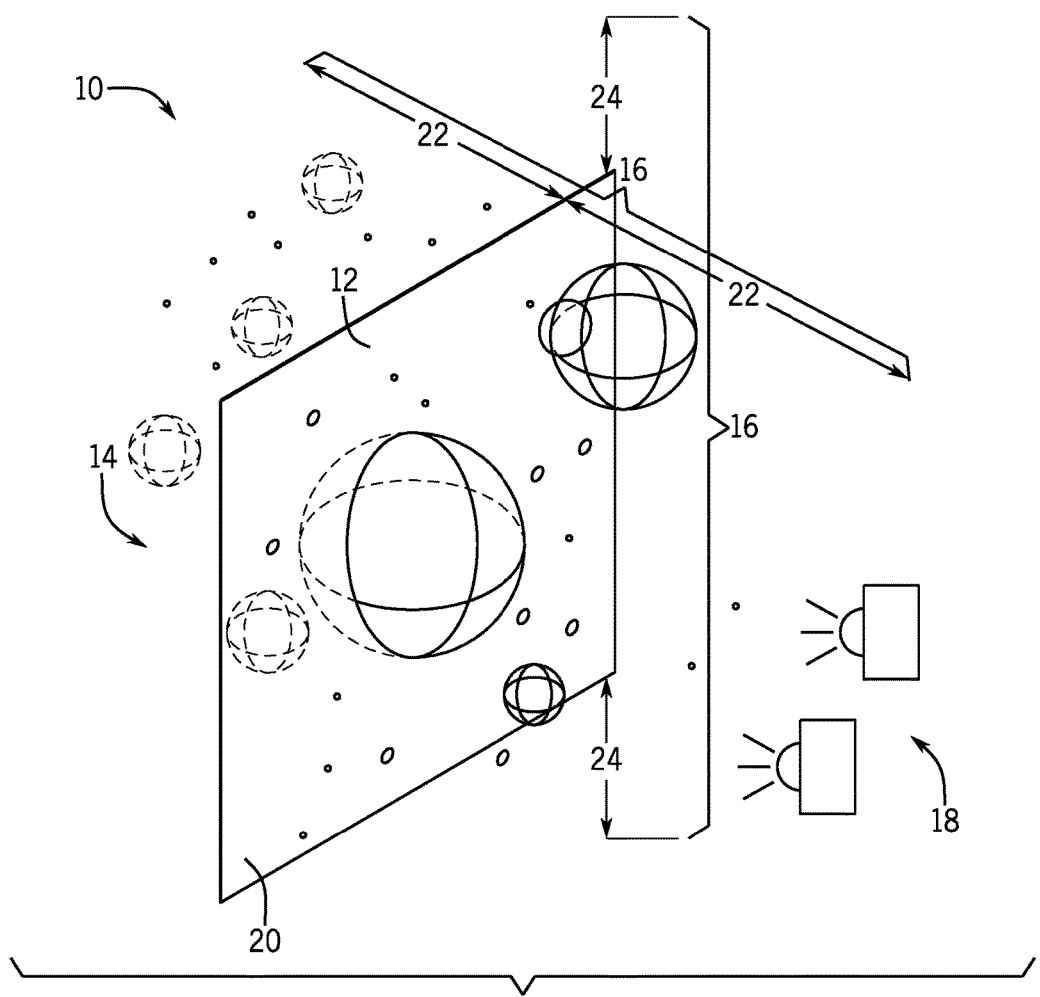
FIG. 1 is a perspective view of a schematic of a holographic image apparatus, in accordance with an embodiment.

Turning to the drawings, FIG. 1 is a perspective view of an embodiment of a holographic image apparatus 10. In the illustrated embodiment, the holographic image apparatus 10 includes a holographic panel or print 12 encoded with holographic 3D content 14 that has an in-focus DOF 16. In some embodiments, the holographic panel 12 may include substantially transparent material (e.g., transparent with respect to visible light) such as glass (as opposed to an opaque material). In some embodiments, the holographic panel 12 may include tinted material (e.g., having about 90% to about 60%, such as about 90% to about 80%, about 80% to about 70%, about 70% to about 60%, about 60% to about 50%, about 50% to about 40%, about 40% to about 30%, about 30% to about 20% light transparency). The holographic image apparatus 10 also includes one or more light sources 18 configured to illuminate the holographic panel 12 from one or more incident angles (e.g., angles with respect to the surface normal of the holographic panel 12). The one or more light sources 18 may be dedicated light sources or may be integrated light sources in the surrounding where the holographic panel 12 is disposed, such as a common lighting system in a space (e.g., a display room, a stage).

When the holographic panel 12 is illuminated by the one or more light sources 18, the produced hologram image (e.g., the holographic 3D content 14) is in-focus (e.g., clear and crisp) within the DOF 16. The holographic panel 12 may be a single-channel hologram or may be a multi-channel hologram, such that different frames of images are revealed when the holographic panel 12 is illuminated from different incident angles of the one or more light sources 18 or when observers view the holographic panel 12 from different viewing angles. In some embodiments, the DOF 16 may be about 400 millimeters (mm) from a surface 20 of the holographic panel 12 (e.g., a distance 22 is about 200 mm) and/or about 200 mm above and below the holographic panel 12 (e.g., a distance 24 is about 200 mm). As set forth above, the DOF of the holographic panel 12 is limited by the holographic element resolution, which may be difficult to improve. In accordance with present embodiments, the DOF of a hologram may be improved without altering the holographic element resolution. In particular, it is now recognized that in-focus, high depth of field 3D imagery may be achieved using a plurality of holographic panels to form a composite hologram image as discussed below.

FIG. 2 is a perspective view of an embodiment of the holographic image apparatus 10 that includes a stack of holographic panels or prints 30 (e.g., a plurality of holographic panels) to extend the DOF. In the illustrated embodiment, the holographic image apparatus 10 includes the one or more light sources 18 and a plurality of the holographic panels 12 stacked or arranged adjacent to one another with a gap 32 between adjacent holographic panels 12. The gap 32 may be considered to represent a distance from the center of one holographic panel 12 to the center of an adjacent holographic panel 12 in the surface normal or out of plane direction. As discussed later, the gap 32 may be a constant value or may change (e.g., increase or decrease) for different pairs of adjacent holographic panels 12.

Although in the illustrated embodiment only three holographic panels 12 are shown, the stack of holographic panels 30 may include any suitable number of holographic panels 12. In the illustrated embodiment, the stack of holographic panels 30 are arranged such that surface normals or out of plane directions 34, 36, and 38 of the holographic panels 12 are approximately aligned in the same direction, and edges 40, 42, and 44 of the holographic panels 12 are also approximately aligned with respect to one another. However, in other embodiments, the holographic panels 12 may be arranged in other relative configurations. For example, FIGS. 3A, 3B, and 3C each show a top view of an arrangement of the stack of holographic panels 30, wherein the orientation of each holographic panel 12 may be characterized in terms of the gap 32, a tilt angle, and/or a shift or shift distance. As shown, the stack of holographic panels 30 may be described with reference to a surface normal 50 and orthogonal axes 52 and 54 in the plane of a reference holographic panel 56 in the longitudinal and lateral directions. Note that the directions are defined by parallel edges of the reference holographic panel 56. More specifically, the one or more gaps 32 (e.g., direction and distance) are described with respect to the surface normal 50 of the reference holographic panel 56. The one or more tilt angles are described with respect to the surface normal 50 of the reference holographic panel 56 (e.g., a relationship between a surface normal of the respective holographic panel and the surface normal 50 of the reference holographic panel 56). The one or more shifts (e.g., direction and distance) are described with respect to the reference holographic panel 56 and with respect to the orthogonal axis 52.

With this in mind, FIG. 3A shows the stack of holographic panels 30 having one or more holographic panels 12 tilted and/or shifted with respect to one another. In the illustrated embodiment, the stack of holographic panels 30 includes the reference holographic panel 56 and first and second offset holographic panels 60 and 62. The first offset holographic panel 60 is tilted with respect to the reference holographic panel 56 with a tilt angle 64 (e.g., an angle between the surface normal of the first offset holographic panel 60 and the surface normal 50) and shifted with respect to the reference holographic panel 56 with a shift 66 (e.g., direction and distance). The second offset holographic panel 62 is tilted with respect to the reference holographic panel 56 with a tilt angle 68 (e.g., an angle between the surface normal of the second offset holographic panel 62 and the surface normal 50) and shifted with respect to the reference holographic panel 56 with a shift 70. It should be noted that the tilt angle (e.g., the tilt angles 64 and 68) could be along the orthogonal axis 52, the orthogonal axis 54, or both. The shift angles 64 and 68 may have the same value or different values, and the shifts 66 and 70 may be the same distance or different distances.

FIG. 3B shows the stack of holographic panels 30 having the holographic panels 12 arranged with variable gaps. As set forth above, the gap 32 is described as a distance from the centers of the adjacent holographic panels 12 in the surface normal 50 or out of plane direction. Herein, the centers of the holographic panels 12 are indicated by points 33. In the illustrated embodiment, the stack of holographic panels 30 includes the reference holographic panel 56 and holographic panels 72 and 74. The holographic panels are arranged such that there is a first gap 78 between the reference holographic panel 56 and the holographic panel 72, and a second gap 80 between the holographic panels 72 and 74. The first and second gaps 78 and 80 may have the same value or different values.

FIG. 3C shows the stack of holographic panels 30 having the holographic panels 12 arranged with no gap or substantially no gap (e.g., the holographic panels 30 are aligned in their orthogonal axes 52 and 54). In the illustrated embodiment, the stack of holographic panels 30 includes the reference holographic panel 56 and holographic panels 82 and 84. The holographic panels 30 are arranged substantially side by side such that the centers 33 of these holographic panels (e.g., 56, 82, and 84) are aligned in the orthogonal axis 52. There may be a shift 86 between the reference holographic panel 56 and the holographic panel 82, and a shift 88 between the holographic panels 82 and 84. The shifts 86 and 88 may have the same value or different values. It should be noted that the stack of holographic panels 30 may be arranged in any suitable arrangement as discussed in FIGS. 3A, 3B, and 3C, or a combination thereof. The different arrangements of the holographic panels 30 may achieve a larger combined DOF, showing an in-focus, deep, and immersive scene.

Referring back to FIG. 2, the one or more light sources 18 are configured to illuminate one or more respective holographic panels 12 from one or more incident angles. Each of the holographic panels 12 may be made of glass or a similar material with high transparency. In some embodiments, the one or more holographic panels 12 of the stack of holographic panels 30 may be tinted with the same or different transparencies (e.g., about 90% to about 80%, about 80% to about 70%, about 70% to about 60%, about 60% to about 50%, about 50% to about 40%, about 40% to about 30%, or about 30% to about 20% light transparency). In some embodiments, the one or more of holographic panels 12 of the stack of holographic panels 30 may be opaque and/or 100% tinted. In some embodiments, the first holographic panel 12 in the stack of holographic panels 30 with respect to an observer may be substantially transparent, such that the observer may see subsequent holographic panels 12 behind the first holographic panel 12. In some embodiments, the last holographic panel 12 in the stack of holographic panels 30 with respect to the observer may be opaque. In some embodiments, the degree of tinting may increase towards the last holographic panel 12 in the stack of holographic panels 30 with respect to the observer. It should be noted that the distance for each gap 32 is determined by the desired depth of the effect. In this way, the content 14 (see FIG. 1) of each holographic panel 12 remains within the respective DOF, such that a composite hologram image of the stack of holographic panels 30 is clear (e.g., in-focus) as will be discussed with respect to FIG. 4.

FIG. 4 is a schematic perspective view of a composite hologram image 90 produced by the holographic image apparatus 10 of FIG. 2. In the illustrated embodiment, each holographic panel 12 of the stack of holographic panels 30 may be encoded with holographic 3D content 14 that may be the same or different from one another. Each of the content 14 has a corresponding DOF 16, and the DOF 16 may be different or the same for each holographic panel 12. The gap 32 between the adjacent holographic panels 12 is controlled, such that a first image 92 of the holographic panel 12 overlaps with a second image 94 of the adjacent holographic panel 12 with an overlapping region 96. In accordance with present embodiments, both the first and second images 92 and 94 are in-focus (e.g., the DOF of the first image 92 overlaps with the DOF of the second image 94).

By keeping the content 14 of each holographic panel 12 within the appropriate depth bounds (e.g., within the DOF) and by stacking the holographic panels 12 adjacent to one another, the composite hologram image 90 is produced in-focus and has a high DOF. In particular, the overall depth effect of the composite hologram image 90 may be tunable without altering the holographic element resolution, and may far exceed that possible from a single holographic panel 12. For example, the overall depth effect of the composite hologram image 90 may increase with the number of holographic panels 12. In the illustrated embodiment, the composite hologram image 90 (e.g., the first and second images 92 and 94 combined) has an overall depth effect that spans the DOF of the first image 92 and the DOF of the second image 94, which exceeds the DOF of the first image 92 or the DOF of the second image 94 alone. As such, the content 14 of each holographic panel 12, and therefore the composite hologram image 90 as a whole, would remain in-focus and clear throughout a depth 98 of the entire composite hologram image 90 (e.g., a combined depth of field).

It may be appreciated that because the holographic panels 12 are substantially transparent or at least partially transparent, the presence of the holographic panels 12 does not block or obstruct the continuity of the composite hologram image 90. By way of non-limiting example, a scene may be recorded and encoded onto the stack of holographic panels 30, such that each of the holographic panels 12 contains a portion of the scene. The stack of holographic panels 30 are arranged with adjacent holographic panels 12 placed with appropriate gaps 32 such that when the stack of holographic panels 30 are illuminated by the one or more light sources 18, each holographic panel 12 produces an image that forms a portion of the composite hologram image 90, with the multiple images together showing the in-focus, deep, immersive scene.

FIG. 5 is a block diagram of certain components forming the holographic image apparatus 10 of FIG. 2. In the illustrated embodiment, the holographic image apparatus 10 includes a controller 100 operatively coupled to an imagery system 102. The imagery system 102 includes the holographic panels 12 and the one or more light sources 18 as set forth above. The imagery system 102 may also, in certain embodiments, include one or more actuators 104 coupled to the one or more light sources 18, the one or more actuators 104 being configured to control the arrangement or orientation of the one or more light sources 18 upon receiving one or more instructions (e.g., one or more control signals) from the controller 100. For example, the one or more actuators 104 may move the one or more light sources 18 and/or control one or more incident angles of the one or more light sources 18 on the holographic panels 12. The imagery system 102 may also, in some embodiments, include one or more actuators 106 coupled to the holographic panels 12. In some embodiments, the one or more actuators 106 are configured to control the arrangement or orientation of the holographic panels 12 upon receiving one or more instruction (e.g., one or more control signals) from the controller 100. For example, the one or more actuators 106 may move the holographic panels 12, change the values of the one or more gaps (e.g., gaps 32, 78, and 80), change the values of the one or more tilt angles (e.g., tilt angles 64 and 68), and/or change the values of the one or more shifts (e.g., shifts 86 and 88), as discussed in relation to FIGS. 2 and 3. The one or more actuators 104 and 106 may be any one or a combination of suitable actuators (e.g., hydraulic, pneumatic, electric, thermal or magnetic, or mechanical actuators).

To provide for control over various operational parameters of the imagery system 102, the controller 100 may include a processor 108 and a memory 110 (e.g., non-transitory computer-readable medium/memory circuitry) communicatively coupled to the processor 108. The controller 100 may also include a user interface 112 communicatively coupled to the processor 108 and/or the memory 110 to enable a user to provide inputs to control operation of the imagery system 102. For example, the inputs may include, but are not limited to, on/off switches, positions, and/or incident angles of the one or more light sources 18, and the arrangement of the holographic panels 12, such as positions, the one or more gaps (e.g., gaps 32, 78, and 80), the one or more tilt angles (e.g., tilt angles 64 and 68), and the one or more shifts (e.g., shifts 86 and 88).

The processor 108 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits. The memory 110 may include volatile memory, such as random access memory (RAM), and/or non-volatile memory, such as read-only memory (ROM), optical drives, hard disc drives, or solid-state drives. The memory 110 may store one or more sets of instructions (e.g., processor-executable instructions) and/or algorithms implemented to perform operations related to operation of the imagery system 102. For example, the memory 110 may store instructions to turn on or off the one or more light sources 18 and/or instructions to control the one or more actuators 104 and 106 in the manner discussed above (e.g., changing positions, orientations, and/or arrangements of the one or more light sources 18 and the holographic panels 12). For example, the memory 110 may store information about the holographic panels 12, such as information of the encoded holographic 3D content 14 and the in-focus DOF 16 for each of the holographic panels 12. For example, the memory 110 may store algorithms to determine the arrangement of the holographic panels 12 (e.g., gaps, tilt angles, and/or shifts) based on the DOF 16 of each individual holographic panel 12, such that the encoded content 14 of adjacent holographic panels 12 overlap and are in-focus. In this way, the controller 100 may be considered an imagery system controller, which includes certain programmed algorithmic structure that carries out certain operational methods associated with the illumination and movement of the holographic panels 12.

FIG. 6 is a flow chart illustrating an example of a method 120 of forming the composite hologram 90 using the holographic image apparatus 10. While the method 120 is described using acts performed in a specific sequence (as represented in blocks), it should be understood that the present disclosure contemplates that the described acts may be performed in different sequences than the sequence illustrated, and certain described acts may be skipped or not performed altogether in other embodiments. The method 120 may include providing a plurality of holographic panels (block 122). For example, providing the plurality of holographic panels may include recording and/or encoding a scene on the stack of holographic panels 30, such that each of the holographic panels 12 contains a portion of the scene. As set forth above, the holographic panels 12 may include substantially transparent material such as glass (as opposed to an opaque material). In some embodiments, at least some of the holographic panels 12 may include tinted material (e.g., having about 90% to about 80%, about 80% to about 70%, about 70% to about 60%, about 60% to about 50%, about 50% to about 40%, about 40% to about 30%, about 30% to about 20% light transparency). The degree of tinting may depend at least in part on the content of the encoded content of the holographic panel 12. For example, the degree of tinting may increase towards the first or the last holographic panel in the stack of holographic panels 30 (e.g., the holographic panel that includes an edge or ending portion of the scene). Furthermore, each of the holographic panels 12 may be a single-channel hologram or a multi-channel hologram.

The method 120 may include placing the plurality of holographic panels adjacent to one another (block 124). More specifically, the plurality of holographic panels 12 may be stacked or arranged in such a way that each of the holographic panels 12 remains within the respective DOF, such that a composite hologram image of the stack of holographic panels is clear (e.g., in-focus). For instance, the orientation and/or distance between adjacent holographic panels 12 (e.g., gaps, tilt angles, shifts) are determined by the desired depth of the effect. For example, the distances (e.g., the gaps 32, the shifts 86 and 88) between adjacent holographic panels 12 may be controlled such that hologram images of the adjacent holographic panels overlap, and both of the adjacent hologram images are in-focus. By way of non-limiting example, the stack of holographic panels may be arranged in ways discussed in relation to FIGS. 2-4 or a combination thereof. In some embodiments, block 124 may include coupling the plurality of holographic panels to actuator(s) (block 126). For example, the plurality of holographic panels 12 may be coupled to the one or more actuators 106 to enable changing positions and/or orientations of the plurality of holographic panels 12 upon receiving control signals from the controller 100.

The method 120 may include placing light sources to illuminate the plurality of holographic panels (block 128). For example, block 128 may include disposing the one or more light sources 18 in proximity to the stack of holographic panels 30 to illuminate the stack of holographic panels 30 from suitable light incident angles. The one or more light sources 18 may be disposed at positions and orientations suitable to illuminate one or more than one holographic panel 12. In some embodiments, block 128 may optionally include coupling the light sources to actuators (block 130). For example, the one or more light sources 18 may be coupled to the one or more actuators 104 to enable changing positions and/or orientations of the one or more light sources 18 to change the light incident angles upon receiving control signals from the controller 100. In some embodiments, different frames of hologram images may be revealed when the multi-channel holographic panels 12 are illuminated from different incident angles.

The method 120 may include illuminating the plurality of holographic panels to form a composite hologram image (block 132). For example, the one or more light sources 18 are turned on manually or upon receiving control signals from the controller 100 to illuminate the stack of holographic panels 30 to form the composite hologram image 90.

FIG. 7 is a flow chart illustrating an example of a method 140 of operating the holographic image apparatus 10 using the controller 100. While the method 140 is described using acts performed in a specific sequence, it should be understood that the present disclosure contemplates that the described acts may be performed in different sequences than the sequence illustrated, and certain described acts may be skipped or not performed altogether in other embodiments. The method 140 may include coupling the control 100 to the imagery system 102 (block 142). For example, the controller 100 is operatively/communicatively coupled to various components of the imagery system 102, such as the one or more light sources 18, the holographic panels 12, and the one or more actuators 104 and 106.

As illustrated, the method 140 may include receiving inputs form a user (block 144). For example, the controller 100 may receive inputs from a user via the user interface 112 coupled to the processor 108 and/or the memory 110 of the controller 100. The inputs may include instructions to adjust operational parameters of the one or more light sources 18 and/or the holographic panels 12. The inputs may include, but are not limited to, on/off switches, positions, and/or incident angles of the one or more light sources 18, and the arrangement of the holographic panels 12, such as positions, the one or more gaps (e.g., gaps 32, 78, and 80), the one or more tilt angles (e.g., tilt angles 64 and 68), and the one or more shifts (e.g., shifts 86 and 88).

Indeed, to provide for more control of the holographic image, the method 140 may include controlling the particular arrangement of the holographic panels 12 (block 146). For example, the controller 100 may send instructions to the one or more actuators 106 to change parameters associated with arrangements and/or orientations of the panels 12, such that adjacent hologram images of the holographic panels 12 are in-focus. These parameters may include, but are not limited to, the one or more gaps (e.g., gaps 32, 78, and 80), the one or more tilt angles (e.g., tilt angles 64 and 68), and the one or more separation distances (e.g., shifts 86 and 88), or a combination thereof.

The method 140 may also include controlling operation of the one or more light sources 18 (block 148). For example, the controller 100 may send instructions to the one or more actuators 104 to change various operational parameters of the one or more light sources 18. For instance, the operational parameters may include, but are not limited to, on/off states, positions, and/or incident angles of the one or more light sources 18 relative to the respective one or more holographic panels 12.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A hologram image apparatus, comprising:
a plurality of holographic panels, each holographic panel of the plurality of holographic panels comprising a transparent panel encoded with an interference pattern corresponding to a portion of a composite hologram image; and
one or more light sources configured to emit light and to illuminate each holographic panel of the plurality of the holographic panels from one or more incident angles, wherein the interference pattern of each respective holographic panel causes the plurality of holographic panels to diffract the emitted light to produce the composite hologram image.

2. The hologram image apparatus of claim 1, wherein holographic panels of the plurality of holographic panels are arranged adjacent to one another such that respective depth of fields of the adjacent holographic panels overlap.

3. The hologram image apparatus of claim 1, wherein a depth of field of the composite hologram image corresponds to at least a number of holographic panels of the plurality of holographic panels.

4. The hologram image apparatus of claim 1, wherein at least one holographic panel of the plurality of holographic panels is configured as a multi-channel holographic panel.

5. The hologram image apparatus of claim 1, wherein the transparent panel of at least one holographic panel of the plurality of holographic panels comprises a glass panel that is transparent with respect to visible light.

6. The hologram image apparatus of claim 1, wherein the transparent panel of at least one holographic panel of the plurality of holographic panels is tinted to have about 90% to about 80% light transparency.

7. The hologram image apparatus of claim 1, wherein the transparent panel of at least one holographic panel of the plurality of holographic panels is tinted to have about 80% to about 70% light transparency.

8. The hologram image apparatus of claim 1, wherein the transparent panel of at least one holographic panel of the plurality of holographic panels is tinted to have about 70% to 60% light transparency.

9. The hologram image apparatus of claim 1, comprising one or more actuators operatively coupled to the plurality of holographic panels, wherein the one or more actuators are configured to be controlled by a controller to change arrangements and/or orientations of the plurality of holographic panels.

10. The hologram image apparatus of claim 1, comprising one or more actuators operatively coupled to the one or more light sources, wherein the one or more actuators are configured to be controlled by a controller to change the one or more incident angles.

11. A method of forming a composite hologram, comprising:
placing holographic panels adjacent to one another such that a gap exists between adjacent holographic panels, wherein the gap is such that respective depths of field of adjacent holographic panels overlap with one another, and wherein each of the holographic panels is encoded with an interference pattern corresponding to a portion of the composite hologram; and
illuminating the holographic panels from one or more incident angles using one or more light sources to produce the composite hologram.

12. The method of claim 11, comprising increasing a number of the holographic panels to increase a total depth of field of the composite hologram.

13. The method of claim 11, comprising coupling at least one of the holographic panels to one or more actuators operatively coupled to a controller to change the gap between adjacent holographic panels.

14. The method of claim 13, comprising changing a tilt angle of the at least one of the holographic panels and/or shift distances between adjacent holographic panels.

15. The method of claim 11, comprising coupling the one or more light sources to one or more actuators operatively coupled to a controller to change the one or more incident angles.

* * * * *